Dec. 7, 1943.  L. J. BEINDORF  2,336,436
SPHERE ROTATING AND CONTROLLING APPARATUS
Filed March 12, 1942  3 Sheets-Sheet 1
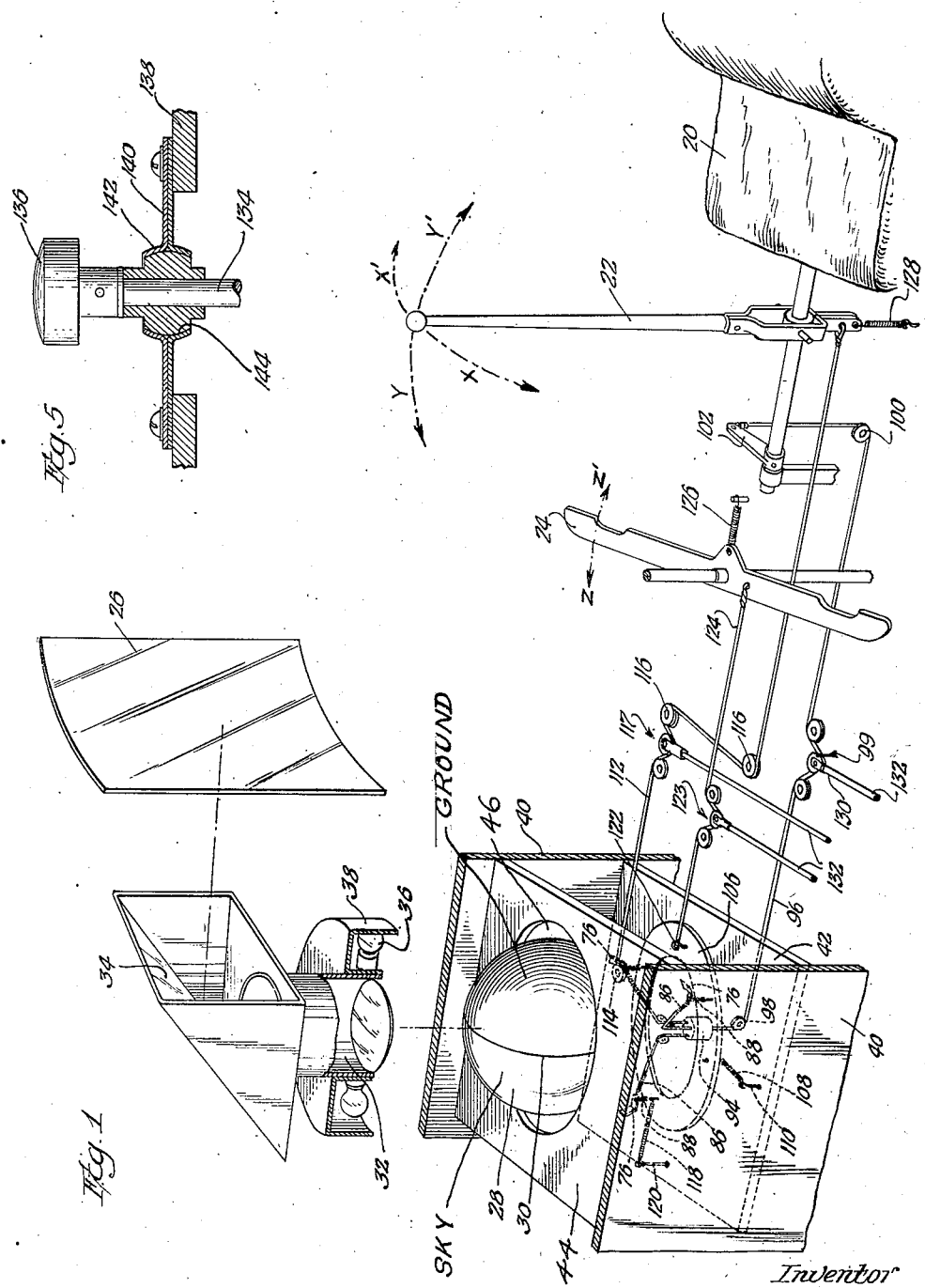
Inventor
Lucien J. Beindorf
By
Williams, Bradbury & Hinkle
Attys.

Dec. 7, 1943.　　　L. J. BEINDORF　　　2,336,436
SPHERE ROTATING AND CONTROLLING APPARATUS
Filed March 12, 1942　　　3 Sheets-Sheet 2
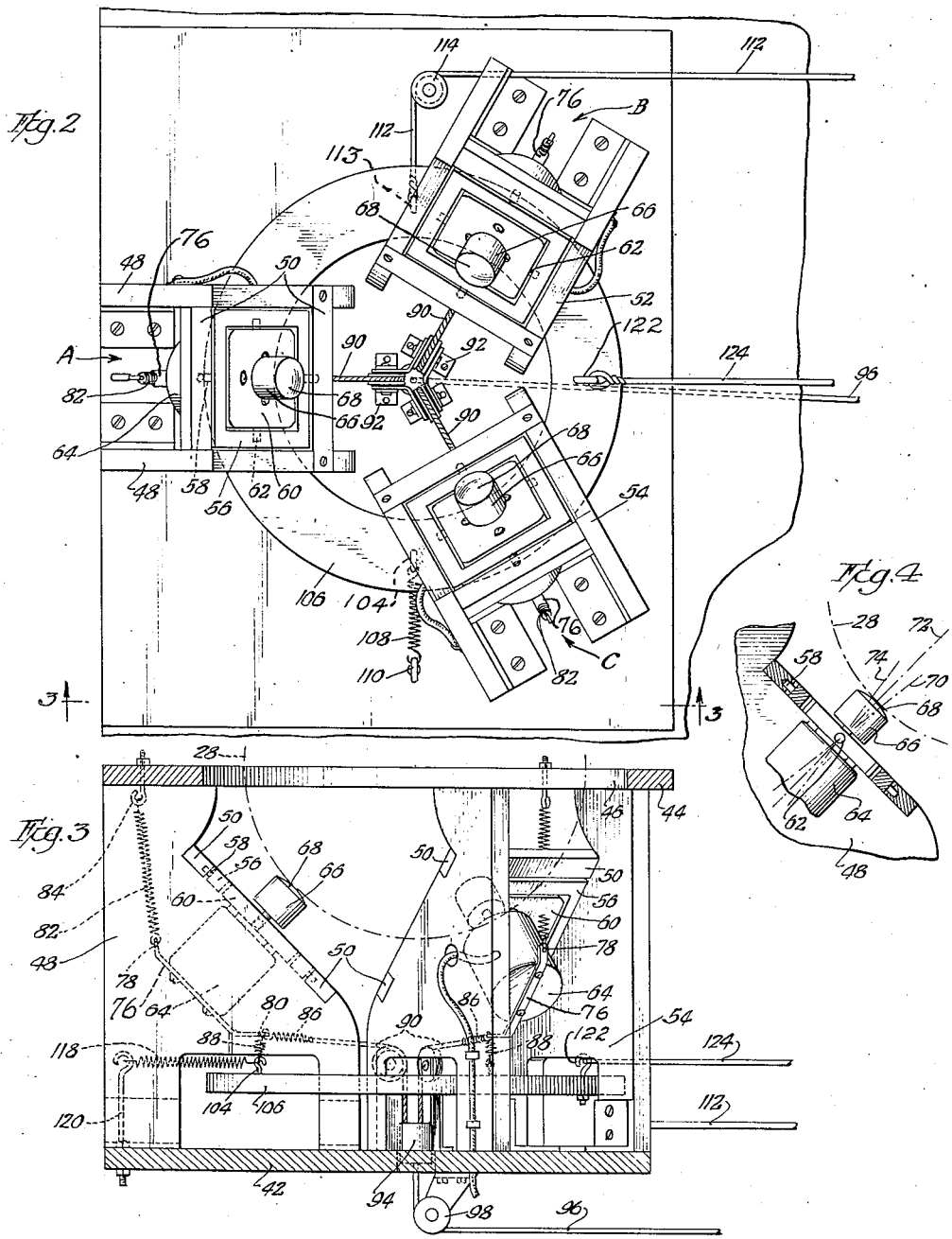
Inventor
Lucien J. Beindorf
By
Williams, Bradbury & Hinkle
Attys.

Dec. 7, 1943.     L. J. BEINDORF     2,336,436
SPHERE ROTATING AND CONTROLLING APPARATUS
Filed March 12, 1942     3 Sheets-Sheet 3
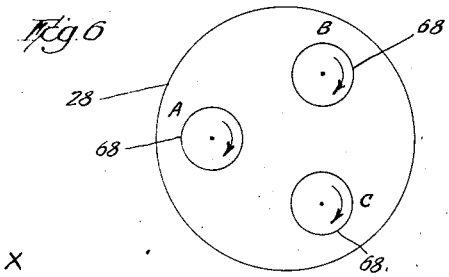
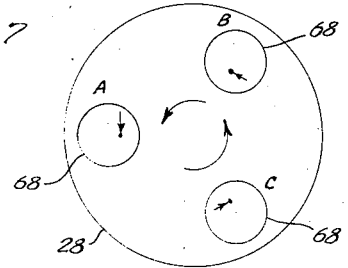 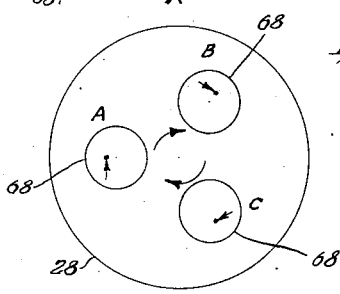
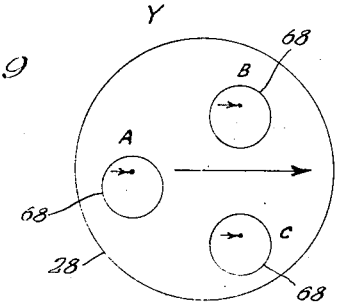 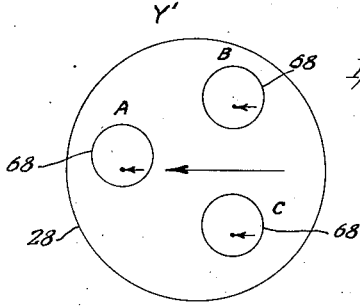
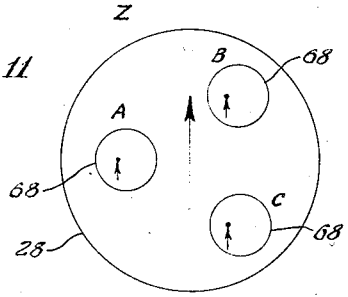 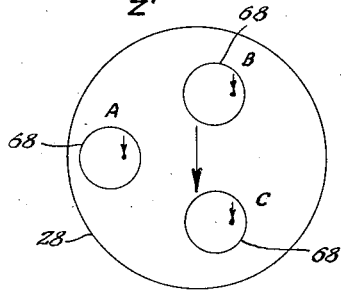
Inventor
Lucien J. Beindorf Patented Dec. 7, 1943

2,336,436

UNITED STATES PATENT OFFICE 2,336,436

SPHERE ROTATING AND CONTROLLING APPARATUS

Lucien J. Beindorf, La Grange, Ill., assignor, by direct and mesne assignments, of forty-five per cent to William H. Hutter, Chicago, Ill.

Application March 12, 1942, Serial No. 434,405

13 Claims. (Cl. 35—12)

The present invention relates to what may be termed a sphere rotating and controlling apparatus. More particularly, the invention is concerned with the provision of a novel sphere supporting and drive means, and controlling means therefor, through the operation of which a sphere can be made to rotate in any direction at any desired velocity from zero to a predetermined maximum without the center of curvature of the sphere being moved substantially from a fixed point.

As an example of a particular embodiment of my invention, the apparatus here shown, described and claimed is adapted for the purpose of instructing students in the operation of aircraft. The device, which hereafter will be referred to as a trainer, has conventional airplane controls. These controls are operated in the conventional manner so as to rotate a sphere in such a manner that when an isolated portion thereof is projected on a screen by means of suitable optical equipment, the portion so projected will form an image which will move in a manner that simulates the movement of the image seen through the windscreen of a conventional airplane when the controls therein are similarly moved. The student therefore receives the illusion of being in flight in an airplane in so far as the visual senses are concerned.

Although the sphere rotating and controlling apparatus is illustrated in an embodiment suitable for use as an aircraft trainer, it will be appreciated that drive mechanism embodying the present invention can be used for rotating spheres for other purposes and that such drive mechanism can be controlled by other than standard aircraft controls.

The principal object of the present invention is to provide a novel mechanism for supporting and rotating a sphere in any direction at any velocity up to a maximum velocity for which the apparatus is designed.

An additional object of the present invention is to provide a novel suitable control arrangement for controlling the rotational movement of such a sphere.

Still another object of the present invention is to provide novel apparatus fulfilling the above objectives and in which the center of the sphere need not move appreciably from a fixed point during rotational movement.

Yet another object of the invention is to provide a novel aircraft trainer which utilizes a universally rotatable sphere.

Still another object is to provide a novel aircraft trainer in which the operator sees a view that simulates the view normally seen from the windscreen of a conventional airplane.

Yet another object of the present invention is to provide a device incorporating the last above mentioned objective and in which the view seen in the trainer moves under the influence of the aircraft controls in the same manner that a similar view moves when similar controls of a conventional airplane are similarly operated.

Still another object of the present invention is to provide a supporting and driving arrangement for a sphere such that the driving members can be rotated constantly at a uniform velocity and wherein by operation of controls, the constant uniform velocity of the driving members can be imparted to the sphere in such a manner as to drive the sphere from zero to a maximum velocity in any direction.

Still another object of the present invention is to provide a novel supporting and driving arrangement for a sphere fulfilling the last above mentioned objectives and in which, in addition, the sphere rests upon three supporting and driving members so arranged that it automatically centers itself.

Still another object of the present invention is to provide an apparatus of the type described fulfilling the objectives of the last two above mentioned objects and in which the sphere can be quickly and easily separated from the remaining portion of the device so as to be replaced by a different sphere if desired.

An additional object of the present invention is to provide suitable apparatus for carrying out all of the above-mentioned objects at comparatively low expense and through the use of a minimum of complicated equipment.

Other objects and advantages will become apparent from the following description of a preferred embodiment of the invention, taken in conjunction with the accompanying drawings in which:

Fig. 1 is a diagrammatic perspective view of an aircraft trainer embodying the present invention;

Fig. 2 is a plan view of the sphere supporting and driving mechanism;

Fig. 3 is a vertical longitudinal sectional view taken in the direction of the arrows substantially along the line 3—3 of Fig. 2;

Fig. 4 is a fractional view of a portion of the sphere supporting and driving mechanism and shows in greater detail the mounting of one of the supporting and driving members;

Fig. 5 illustrates in vertical medial section an alternative arrangement for mounting the supporting and driving members;

Figs. 6 to 12 illustrate diagrammatically the manner in which the sphere can be driven in any direction by differential movement of the sphere supporting and driving members.

Referring to the drawings, in which similar characters of reference refer to similar parts throughout the several views, the aircraft trainer illustrated in Fig. 1 is comprised in general of a seat 20 in which an operator sits with a control stick 22 and a rudder bar 24 before him. The stick 22 and the rudder bar 24 comprise the essential aircraft controls and are to be handled by the operator in the same manner that similar controls would be handled in a conventional airplane. In addition to these controls, a throttle lever also can be provided, if desired, and although not shown, such a throttle lever can be connected with the motors to be described so as to start the mechanism when the throttle lever is manipulated in a manner which ordinarily opens the throttle of a conventional aircraft engine. If desired also the throttle can be connected to some type of noise making apparatus which simulates an aircraft motor. These refinements, however, form no part of the present invention and need no detailed discussion here.

Before him the pilot sees a screen 26 which may be of frosted glass and which appears to the observer to be the wind screen of the aircraft. Although not shown in the drawings, the operator is completely enclosed in a darkened cabinet so that the view in the screen 26 is the only thing to be seen. Somewhat in front of the screen 26 and at a lower level is positioned a sphere 28 which preferably is divided by a meridian line 30 into a sky portion and a ground portion, the meridian line 30 serving as the horizon line, that is one-half of this sphere may be painted light blue with white clouds thereon to simulate the sky, while the other half may be brown to simulate the earth, and if desired, may include portions painted to simulate fields, wooded areas, lakes, rivers, roads, cities and the like.

A projection lens 32 preferably of comparatively short focal length is arranged above the sphere 28, while an inclined front surfaced mirror 34 is arranged above the lens 32 in such a position that the lens focuses a small portion of the sphere immediately thereunderneath upon the screen 26. This portion of the sphere is brightly illuminated by several light bulbs 36 arranged in an annular reflector 38 that surrounds the lens 32. Thus the operator in the seat 20 looking at the screen 26 sees an enlarged view of a small area of the sphere 28. It will be seen, therefore, that as the sphere rotates about its center of curvature, the view on the screen 26 constantly changes.

When the sphere 28 is oriented, as shown in Fig. 1, the operator will see a view on the screen 26 which simulates the view normally seen from an aircraft when the aircraft is in level flight. Now if the sphere 28 is caused to rotate about a vertical axis from side to side, the meridian line 30 will be caused to swing on the screen in the same manner that the horizon moves when seen from an airplane when the airplane is rolled about its longitudinal axis, that is, when the airplane rocks from side to side. Side to side movement of the stick 22, therefore, controls this movement. If the sphere 28 is caused to rotate about an axis extending longitudinally of the trainer, the image on the screen 26 will make it appear to the operator that the airplane is yawing about a vertical axis. As will be explained more fully subsequently, control of the movement of the sphere in this direction is under the influence of the rudder bar 24. If the sphere 28 is caused to rotate about a transverse axis, the view on the screen 26 will be the same as that viewed from an aircraft when the elevators are raised and depressed, that is, the horizon will move upwardly or downwardly. Backward and forward movement of the stick 22, therefore, is connected to effect movement in this direction.

Referring more particularly to Figs. 1, 2, 3, and 4, it will be seen that the sphere supporting, driving and controlling structure, which is located generally beneath the sphere 28 is housed between a pair of parallel vertical boards or plates 40, which are connected together by means of a base board 42 near their lower ends and by an upper board 44 having a large circular opening 46 therein to accommodate the sphere 28. The side boards 40, the base board 42 and the top board 44 together form a rigid boxlike structure open at the front and back and closed at the sides.

Toward the front of the base board a pair of parallel brackets 48 are arranged side by side a few inches apart along the center line of the device. These two brackets are secured to the base board 42 at their lower edges and support the upper board 44 at their upper ends. The inwardly facing edges of these brackets are disposed at an angle of approximately 45° to the base line, although this angle is not critical, it being necessary merely that they be so shaped that the sphere will not touch the brackets when located in place as will appear more fully subsequently.

The two brackets 48 are connected together and cross-braced by means of top and bottom transversely extending strips 50 so as to add to the rigidity of this portion of the structure.

Similar sets of brackets 52 and 54 are arranged in pairs with the center line between each pair at an angle of 120° on each side of the brackets 48, so that the three sets of brackets have their center lines 120° apart. They are thus equally spaced around a central point.

The sphere supporting and driving sub-assemblies, of which there are three, are identical and only one need be described in order to give a full understanding of the arrangement and construction of all three. The two cross-bracing members 50 are spaced apart a distance approximately equal to the spacing between the brackets 48 and thus together with the edges of these brackets define an approximately square opening. A rectangular gimbal ring 56, somewhat smaller than the opening between the cross braces 50 and the edges of the brackets 48, is disposed in this opening and is pivoted at the midpoints of its top and bottom edges by means of pins 58 which extend into the transverse members 50. This ring 56 is free to pivot from side to side and when in its intermediate position, a line drawn across its face at right angles to a line through the pins 58 is horizontal, the line through the pins 58 being inclined at an angle of 45° to the horizontal. The gimbal ring 56 is provided with a second gimbal 60 located centrally of the first gimbal and pivoted thereto by means of pins 62 at right angles to the pins 58. Thus, the inner gimbal 60 is free to move universally, that is, it can rock from side to side about the pins 58 or up and down about the pins 62. Motion between these two planes is brought about by a combined movement about both sets of pins 58 and 62.

The inner gimbal 60 supports a small electric motor 64. This motor includes a speed reduction gear train, so that its output shaft turns at comparatively low speed, approximately 90 R. P. M. being satisfactory. The motor shaft projects upwardly through the center of the inner gimbal 60 and is perpendicular to the plane of this inner gimbal. The motor and shaft therefore are arranged for universal movement and the center about which this movement takes place is the point of intersection of lines passing through the pins 62 and 58.

The end of the motor shaft is provided with a driving element 66 having a spherical end face or nose 68 against which the sphere 28 rests. The center of curvature of the spherical surface of the nose lies at the intersection of the lines passing through the pins 58 and 62.

Each of the two other supporting and driving sub-assemblies are duplicates of the one described, and for convenience the one just described will be referred to as the supporting and driving assembly A, while the one above in Fig. 2 will be indicated by the letter B, and the third of these assemblies by the letter C. All of these supporting and driving assemblies are properly spaced from a common center point so that when the sphere 28 is inserted in the opening 46 and permitted to come to rest upon the noses 48 of the driving members 66, lines from the center of the sphere to the intersection of lines drawn through the pins 58 and 62 will pass through the points at which the sphere touches the spherical noses of the driving elements 66; and since the center of curvature of each of these spherical noses lies upon one of these lines, it will be seen that no matter how the motors 64 are swung about so as to move the driving members 66, the points of contact between the driving members and the sphere will always be along lines passing from the center of the sphere through the intersections of the lines passing through the pins 58 and 62. Thus, swinging the motors 64 from side to side or up and down or obliquely will not raise or lower the sphere or shift it from side to side.

Although any one of several substances may be used to form the driving members 66, I have found that corks having holes drilled in one end to permit them to slip over the motor shafts and having their opposite ends shaped to provide the spherical faces 68 are satisfactory for the purpose.

Referring to Fig. 4, it will be seen that when the center line of any one of the motor shafts passes through the center of the sphere, the sphere 28 will touch the spherical nose of the driving member mounted on that shaft at its exact center. Therefore, rotation of the driving member will not have any tendency to move the sphere 28. The element is shown in this position in Fig. 4. If, however, the motor is tilted so as to raise the spherical nose 68, thus bringing broken line 70 of Fig. 4 into alignment with the center line 72, the sphere will contact the spherical nose 68 in an off-center position. Thus, the rotating driving member will impart a tangentially directed linear component to the sphere at the point of mutual contact. The sphere, therefore, tends to rotate. Similarly, if the motor is tilted so as to incline the driving member 66 downwardly from the position shown in Fig. 4, thus bringing the broken line 74 into alignment with the center line 72, there will be a force applied to the sphere in the opposite direction from that applied when broken line 70 is in alignment with the center line 72. Further, it is apparent that the farther the motor is inclined from its central position, the greater will be the velocity of the linear component tending to rotate the sphere.

In Fig. 6 of the drawings is shown diagrammatically what happens when all three of the driving assemblies A, B and C have the center of rotation of their spherical noses 68 in contact with the sphere. Under these conditions no movement of the sphere takes place.

In Fig. 7 each of the driving members 66 has been inclined upwardly, so that the point of contact of each of these members with the sphere is below the center of rotation of the spherical noses 68. Since all of these spherical noses revolve in a clockwise direction, as shown in Fig. 6, there will be a sidewise component applied to the sphere at the point where the spherical noses touch the sphere. These points of contact are indicated in each of the Figs. 6 to 12 by dots within the smaller circles, while the arrows within the smaller circles indicate the direction of the linear component imparted to the sphere at the particular point. Since each of the three forces applied to the sphere in Fig. 7 is applied in a direction tangential to a circle having its center of curvature directly beneath the center of curvature of the sphere 28, the sphere 28 will be caused to rotate as shown by the larger arrows around the center of the larger circle in Fig. 7. In looking downwardly upon the sphere, therefore, this sphere will be seen to revolve in a counterclockwise direction.

In Fig. 8 all of the spherical noses 68 have been tilted downwardly an equal amount, thus bringing the points of contact of these noses with the sphere 28 above the center of rotation of the spherical noses. The effect obtained is directly the opposite of that shown in Fig. 7, thereby causing the sphere to rotate about a vertical axis in a clockwise direction. As will be explained more fully subsequently, the control arrangement for tilting the motors, and hence the spherical noses, in a vertical direction is linked to the stick 22 and is controlled by side to side movement of this stick. From the previous description of what happens when the sphere rotates about a vertical axis, it will be seen that the image produced upon the screen 26 is the same as that seen in a conventional aircraft when the controls are similarly manipulated.

In Fig. 9 each of the spherical noses has been inclined toward the left as seen from the seat 20 or downwardly as seen in Fig. 9. Thus the point of contact of each of the noses B and C is above the center of rotation as seen in Fig. 9, while the point of contact of the nose A is in the same direction but further from its center of rotation. Thus all of the supporting and driving members A, B and C drive the sphere in the same direction, thereby rotating the sphere about a horizontal transverse axis. The reason why the nose A is made to contact the sphere at a point farther from the center of rotation than the points of contact of the noses B and C is that the velocity of the surface of the sphere where it touches the nose A is greater than it is at the points in contact with the noses B and C.

Fig. 10 shows the reverse of the situation shown in Fig. 9. The sphere as shown in this figure rotates about a transverse horizontal axis in a direction opposite to that shown in Fig. 9. By referring to the earlier discussion directed to what happens when the sphere moves, it will be seen that movement of the sphere in the direction shown in Figs. 9 and 10 raises or lowers the horizon line as seen by the operator in seat 20. Therefore, movement of the supporting and driving members to produce the motion in the direction shown in Figs. 9 and 10 is brought about by forward and backward movement of the stick 22.

In Fig. 11 all of the spherical noses A, B and C are shown as being inclined toward the operator in the seat 20 but the noses B and C are inclined somewhat more toward the operator 20 than is the nose A. As will be seen in Fig. 11, this causes the sphere to be rotated about a horizontal longitudinal axis. The necessity for inclining the noses B and C more than the nose A is apparent from the fact that the points of contact of the noses B and C are closer to a plane passing through the center of the sphere normal to the axis of rotation than is the nose A.

In Fig. 12 the spherical noses are inclined in the opposite direction from that shown in Fig. 11 and hence the sphere rotates about a horizontal axis in the opposite direction from that shown in Fig. 11. Movement about this axis of rotation is brought about by the rudder bar control 24 in a manner to be described presently.

Although not specifically illustrated, it will be appreciated that all three or any two of the primary control movements shown in Figs. 6 to 12 can be combined to provide movement of the sphere about any axis between any of the primary axes. To accomplish this oblique movement, or even the movements about the primary axes, it is is advisable that the control system be such that under no conditions will the three rotating noses be tilted in such a manner that the effect of one opposes the effect of the others, that is, skidding of the noses over the face of the sphere should be avoided. Or to put this another way, all control movements to produce rotation of the sphere around any axis should be resolved in the control system, and each resultant force applied to the sphere at each of the three points of support should be tangential to the direction of desired movement of the sphere at that point. As a simple example of this, supposing in Fig. 9 for instance, that nose A was tilted in the same direction as the noses B and C, but was not tilted to a greater extent than the noses B and C. Under such conditions the sphere would still revolve in the direction shown, but one or more of the noses would skid on the face of the sphere, since at least one of the noses would not be driving the portion of the sphere in contact therewith at the velocity it should. The control system used with these supporting and driving elements is so arranged, as will be seen presently, that substantially no skidding takes place and consequently the revolving noses of the units A, B and C produce no substantial abrasive effect upon the sphere.

A metal strip 76 extends across the lower end of each of the motors 64 in a generally vertical direction. The upper end of this strip is bent upwardly somewhat into a substantially vertical position and is provided at its outer end with an eye 78. The lower end of the strip extends somewhat beyond the motor shell and then is bent inwardly in a generally horizontal direction for some distance and is similarly provided with an eye 80. A plane passed through the two eyes 78 and 80 and through the center of curvature of the nose 68 passes through or very close to the center of the sphere 28 when the motor is in normal position.

The upper of these eyes, 78, is secured to one end of a coil spring 82, the opposite end of which is attached to a hook 84 secured to the top piece 44. The spring 82, hook 84 and the eye 78 are all in a vertical plane that passes through the center of rotation of the sphere 28. Thus the effect of the spring 82 is to lift the rearward end of the motor 64. It gives no sidewise component, excepting that if the motor is tilted to one side or the other, the spring will tend to return it to its original central position.

The lower eye 80 is connected to two springs 86 and 88. The spring 86 is connected at its opposite end to a cord or flexible cable 90 which extends inwardly toward the center, over a pulley 92, and downwardly a short distance where it is secured to a block 94. Similar cables 90 are connected to two other springs 86 which are secured to the lower eyes 80 of the other two supporting and driving units, and these cables similarly extend over pulleys 92 and thence downwardly where they are also connected to the block 94. This block in turn is connected to a cable 96 which passes downwardly, around a pulley 98, and then backwardly around slack take up idler pulleys 99, the purpose of which will be explained later, another pulley 100, and from there upwardly where it is secured to the outer end of a lever 102 that moves upwardly and downwardly with the side to side movement of the stick 22. For instance, as seen in Fig. 1, movement of the stick toward the left moves the outer end of the lever 102 upwardly, thereby pulling on the cable 96, which in turn pulls downwardly on the block 94, thereby pulling all three of the cables 90, which in turn pull the lower ends of the motors inwardly against the tension of the springs 82. This raises all of the motor driven noses an equal amount and, as shown in Fig. 7, causes the sphere to rotate about a vertical axis, thereby giving the airplane trainer aileron control in one direction. Control in the opposite direction is accomplished when the stick is moved toward the opposite side, thus lowering the outer end of the lever 102 and permitting the springs 82 to raise the rearward ends of the motors 64 beyond the normal no-drive position.

Each of the other springs 88 attached through the lower eyes 80 extends straight downwardly and are attached to hooks 104 secured in the upper face of an annular ring 106 which extends around beneath each of the motors 64. The ring 106 floats, that is, it does not rest upon anything nor is it maintained in place by anything except the tension of the springs 88.

The right hand side of this ring, as seen in Fig. 1, or the bottom as seen in Fig. 2, is attached to a coil spring 108 which extends radially outwardly and is secured at its opposite end to a hook 110 fastened rigidly to the baseboard 42. The spring 108, therefore, tends to move the ring 106 toward the left as seen in Fig. 1 or downwardly as seen in Fig. 2. The opposite side of the ring is attached to a cable 112 by a ring 113 which extends radially outwardly and passes around a pulley 114 and thence rearwardly around appropriate pulleys 116, including a slack take-up idler 117, to the lower end of the stick 22 where it is attached. Thus forward motion of the stick 22 pulls the cable 112 and causes the ring 106 to move to the right, while backward movement of the stick 22 permits the spring 108 to move the ring 106 to the left as seen in Fig. 1.

A similar spring 118 is attached to the ring 106 at the front edge thereof along the longitudinal center line of the machine and at its opposite end is secured to a hook 120 similar to the hook 110, the hook 120 in turn being secured to the baseboard 42. The spring 118 tends to move the ring 106 forwardly as seen in Fig. 1. The opposite edge of this ring 106 is attached by means of a hook 122 to a third cable 124, which extends backwardly around a set of slack take-up idler pulleys 123 and is connected to the rudder bar 24 to the left of its center. Thus forward movement of the right-hand end of the rudder bar 24 tightens the cable 124, thereby moving the ring 106 rearwardly, while pressure on the left-hand side of the rudder bar 24 permits the spring 118 to move the ring 106 forwardly.

It will be seen that if the right-hand end of the rudder bar 24 is pressed and the cable 124 tightened, so as to move the ring 106 rearwardly, this causes all of the springs 88 to pull the lower ends of the motors 64 toward the seat 20. This causes upward movement of the spherical nose 68 of the unit A, while causing the spherical noses of the other two units to be deflected forwardly. Since the pull of the springs 88 is straight backwardly, tightening of these springs will cause the unit A to move less than the units B and C. This is because the line of pull is directly in line with the springs 82 and 86 of unit A, and these two springs 82 and 86 acting directly against each other tend to maintain their motor in its normal position, the spring 88 of unit A, therefore, stretches somewhat. In units B and C, however, the line of pull of the springs 88 is oblique to the line of action of the springs 82 and 86, and these latter springs therefore exert less centering action upon the motors B and C in a fore and aft direction. The springs 88 of units B and C therefore stretch less than the spring 88 of unit A. In order to obtain this effect to the degree desired, however, the distances from eyes 78 to hooks 84 and from eyes 80 to the pulleys 92 should be great as compared to the length of springs 88. It will be appreciated, therefore, that the effect upon the supporting and driving members will be as shown in Fig. 12 and this, as previously described in detail, simulates control of an airplane around the yawing axis. If the left-hand end of the rudder bar 24 is pushed, it will be appreciated that exactly the opposite effect is accomplished, the effect being as shown in Fig. 11.

If the upper end of the stick 22 is moved forwardly, thus tightening the cable 112 so as to move the ring 106 toward the right, as seen in Fig. 1, the lower ends of the springs 88 will be moved toward the right, thus pulling the lower ends of all of the motors toward the right; but since the spring 88 connected to motor A pulls at right angles to the line of action of springs 82 and 86, these latter springs have only slight centering action and motor A will therefore move considerably. The line of pull through springs 88 of units B and C are oblique to the line of action of springs 82 and 86 of units B and C, however, and the motors of these units therefore move a less amount. The effect upon the sphere 28 will therefore be as shown in Fig. 9. If the stick 22 is moved forwardly, thus permitting the spring 108 to move the ring 106 to the left, the effect will be the exact opposite, or as shown in Fig. 10.

It will be appreciated further that since the ring 106 floats freely, this ring can be moved in an oblique direction by the compound action of longitudinal movement of the stick 22 together with movement of the rudder bar 24. Further, such compound movement can be combined with side to side movement of the stick 22 to move the motors and hence their driving noses in any direction. It will be appreciated further that the full floating spring arrangement shown always moves the driving spherical noses in such a direction and to such a degree that each of the noses imparts a velocity to the portion of the sphere it touches which is proper to revolve the sphere in the desired direction at the desired velocity without skidding or chattering.

In order to neutralize the controls, a tension spring 126 is secured to the center of the rudder bar directly behind its pivot point. This spring therefore always tends to center the rudder bar 24. A similar tension spring 128 is connected to the lower end of the stick 22 and pulls straight downwardly, thus tending to center the stick in a vertical position.

The three sets of idler pulleys 99, 117 and 123 serve two separate purposes. One of these is that movement of the movable pulley in each set, so as to change the amount of slack in the cable passed thereover, provides a simple means for adjusting the apparatus. For instance, with the controls neutralized by the springs 128 and 126, each of the movable idler pulleys can be adjusted so that substantially no movement of the sphere around any axis takes place. To simplify such adjustment, each of the movable pulleys can be connected by a yoke 130 to a cable 132 leading to a control lever in the pilot's compartment.

Another purpose served by these slack adjusting idlers is that they provide a simple means for simulating special conditions likely to be encountered in flight. For instance, by adjusting the movable pulley of the set indicated by the numeral 99, the trainer will simulate flight in an aircraft that is either right-wing or left-wing heavy, depending upon the direction of movement of the movable pulley. Similarly, movement of the movable pulley of the set 117 can be used to simulate nose heaviness or tail heaviness, while similar adjustment of the movable pulley 123 can be used to simulate conditions that arise in an aircraft that tends to yaw either right or left.

Although I have shown the motors 64 as being mounted for universal movement within a double gimbal arrangement, it will be appreciated that this universal movement of the motors can be obtained by other means, such as by mounting the motors in ball and socket arrangements of the type shown in Fig. 5, wherein the motor shaft is indicated by the numeral 134, the spherical nosed driving member by the numeral 136 and the frame by the numeral 138. The frame 138 supports a pair of superposed plates 140 shaped to provide a spherical socket 142 therebetween which embraces a spherically shaped collar 144 through which the shaft 134 is journalled. The shaft 134 and the nose 136, therefore, can move universally with respect to the frame work 138.

If desired, a simple modification can be made in the driving members 66 to adapt the device for more advanced training. For instance, the spherical surfaces 68 can be arranged somewhat eccentric to the axis of rotation of the members 66. With the noses so shaped, the sphere will not remain stationary even with the control centered, but will tend to undulate about its several axes. The psychological effect thus produced is quite similar to that encountered when flying in rough air, that is, the airplane will not remain in any certain attitude, but will tend constantly to move from a desired attitude in all directions. This modification of the device is not shown in the drawings, since it would not readily be apparent even if illustrated, that is, the noses would be shaped like those shown excepting that the spherical faces would be located in a slightly eccentric position relative to the axis of rotation of the motor shafts.

Other modifications will of course suggest themselves as adaptable for use in this mechanism. For instance, although three separate motors are shown for individually driving the several members 66, a single fixed motor could be used, if desired, and could be connected to the separate members 66 by means of appropriate gearing and flexible shafts.

It will be seen that the present invention permits a sphere to be moved in any direction at any velocity up to a maximum velocity, and that such movement can be controlled by the manipulation of three controls adapted individually to give control about the three principal axes. It will be seen further that the present invention accomplishes all of the objectives set out for it at an earlier portion of this specification.

Therefore, what it is desired to claim as new and useful is:

1. A sphere supporting cradle, a sphere supported in said cradle, said cradle including three sphere rotating elements arranged at the apexes of an equilateral triangle, all of said elements being located beneath the center of said sphere and in a substantially horizontal plane and adapted to rotate said sphere in any direction, and means to control said elements to determine the direction of rotation imparted to said sphere.

2. In a device of the class described, a rotatable sphere, means to support and rotate said sphere in any direction, said means comprising three spherically nosed rotatable elements arranged beneath the sphere in a substantially horizontal plane, control means to determine the direction and velocity of rotation of said sphere, a set of airplane controls, means linking said airplane controls to said control means so that control of said sphere is exercised through movement of said airplane controls, and means to enable the operator of said controls to see at least a portion of said sphere.

3. In a device of the class described, a sphere, three equally spaced spherically faced elements arranged beneath said sphere to support the same, means to rotate each of said spherically faced elements about an axis of rotation passing through the center of said sphere, and means to move said spherically faced elements universally and differentially with respect to said axes so that said rotating spherically faced elements will apply a tangentially directed linear component to said sphere at the points of contact between said sphere and said elements.

4. A sphere supporting a rotating device comprising a plurality of spherically faced elements arranged beneath the sphere to support the latter, means for rotating said spherically faced elements about axes extending radially outwardly from the center of the sphere and passing through said elements, and means to incline one or more of the axes of rotation of said spherically faced elements so as to rotate said sphere.

5. A sphere supporting and rotating device comprising a plurality of spherically faced elements arranged beneath the sphere to support the latter, means for rotating said spherically faced elements about axes eccentric to the center of curvature of said spherical faces, said axes extending generally radially outwardly from the center of the sphere, and means to incline the axes of rotation of said spherically faced elements in any direction to cause rotation of said sphere generally about any desired axis.

6. In a device of the class described, a sphere, three equally spaced spherically faced elements arranged beneath said sphere to support the same, means to rotate each of said spherically faced elements about an axis of rotation passing through the center of said sphere, means to move said spherically faced elements universally and differentially with respect to said axes so that said rotating spherically faced elements will apply a tangentially directed linear component of movement to said sphere at the points of contact between said sphere and said elements, a set of airplane controls, means operated by said airplane controls to operate said moving means, a projection screen, and means to project an image of a portion of said sphere on said screen.

7. In a device of the class described, a sphere, three equally spaced spherically faced elements arranged beneath said sphere to support the same, means to rotate each of said spherically faced elements about an axis of rotation passing through the center of said sphere, means to move said spherically faced elements universally and differentially with respect to said axes so that said rotating spherically faced elements will apply a tangentially directed linear component of movement to said sphere at the points of contact between said sphere and said elements, said means for moving said elements including a control means adapted when actuated to tend to move all of said elements in one linear direction together, a second control means adapted when actuated to tend to move all of said elements in a second linear direction together, and a third control means adapted when actuated to tend to move all of said elements mutually toward or away from each other.

8. In a device of the class described, a sphere, three equally spaced spherically faced elements arranged beneath said sphere to support the same, means to rotate each of said spherically faced elements about an axis of rotation passing through the center of said sphere, means to move said spherically faced elements universally and differentially with respect to said axes so that said rotating spherically faced elements will apply a tangentially directed linear component of movement to said sphere at the points of contact between said sphere and said elements, said means for moving said elements including a control means adapted when actuated to tend to move all of said elements in one linear direction together, a second control means adapted when actuated to tend to move all of said elements in a second linear direction together, said control means and said second control means being adapted to move some of said elements more than others of said elements, and a third control means adapted when actuated to tend to move all of said elements mutually toward or away from each other.

9. A sphere supporting and rotating element comprising a rotatable shaft, means mounting said shaft for universal angular movement, resilient means adapted to tend to align said rotatable shaft with one end thereof pointing at the center of the sphere to be supported, resilient means adapted when moved to oppose the last said resilient means and to deflect the axis of rotation of said shaft, and a spherically faced element secured to one end of said shaft and adapted to bear against the sphere to be supported, said spherically faced element having its center of curvature at approximately the center about which said shaft is angularly displaced.

10. In a device of the class described, a sphere, three angularly displaced universally movable rotatable shafts equally spaced radially beneath said sphere, all of said shafts when in their normal positions being aligned with their center lines when projected passing substantially through the center of said sphere, resilient means normally operative to align all of said shafts in the last said position, spherically faced elements upon the ends of said shafts adjacent said sphere and connected to be driven by and to move with said shafts, control means to incline all of said shafts generally in one direction, a second control means adapted when actuated to incline all of said shafts in another direction generally at right angles to the first said direction, and a third control means to incline all of said shafts mutually toward or away from each other.

11. In a device of the class described, a sphere, three angularly displaceable universally movable rotatable shafts equally spaced radially beneath said sphere, all of said shafts when in their normal positions being aligned with their center lines when projected passing substantially through the center of said sphere, resilient means normally operative to align all of said shafts in the last said position, spherically faced elements upon the ends of said shafts adjacent said sphere, control means adapted when actuated to tend to incline all of said shafts generally in one direction, a second control means adapted when actuated to tend to incline all of said shafts in another direction generally at right angles to the first said direction, a third control means adapted when actuated to tend to incline all of said shafts mutually toward or away from each other, said three control means being resiliently interconnected so that actuation of more than one of said control means at one time will produce a compound control effect on each of said shafts.

12. In a device of the class described, a sphere, three angularly displaceable universally movable rotatable shafts equally spaced radially beneath said sphere, all of said shafts when in their normal positions being aligned with their center lines when projected passing substantially through the center of said sphere, resilient means normally operative to align all of said shafts in the last said position, spherically faced elements upon the ends of said shafts adjacent said sphere, control means adapted when actuated to tend to tilt said shafts to rotate said sphere about one principal axis of rotation, a second control means adapted when actuated to tend to tilt said shafts to produce rotation of said sphere about a second principal axis of rotation at substantially right angles to the said first axis, a third control means adapted when actuated to tend to tilt said shafts to produce rotation of said sphere about a third principal axis of rotation at substantially right angles to the two beforementioned axes, said three control means including coordinating mechanism so that actuation of two or more of said control means simultaneously will tilt said shafts so as to produce rotation of said sphere about any intermediate axis of rotation.

13. In a device of the class described, a sphere, three angularly displaceable universally movable rotatable shafts equally spaced radially beneath said sphere, all of said shafts when in their normal positions being aligned with their center lines when projected passing substantially through the center of said sphere, resilient means normally operative to align all of said shafts in the last said position, sphericaly faced elements upon the ends of said shafts adjacent said sphere, control means adapted when actuated alone to tend to incline all of said shafts generally in one direction, a second control means adapted when actuated alone to tend to incline all of said shafts in another direction, a third control means adapted when actuated alone to tend to incline all of said shafts mutually toward or away from each other, all three of said control means being so adapted that when two or more of said control means are actuated simultaneously the tilting effect produced upon said shafts will be a composite of the control effects produced by the separate control means.

LUCIEN J. BEINDORF.